United States Patent [19]

Goker et al.

[11] Patent Number: 5,675,447
[45] Date of Patent: Oct. 7, 1997

[54] METHOD AND ARRANGEMENT FOR INITIATING SEARCH FOR START OF DATA IN ARCUATELY RECORDED DATA TRACKS

[75] Inventors: Turguy Goker, Solana Beach; William A. Buchan, Corona Del Mar, both of Calif.

[73] Assignee: Seagate Technology, Inc., Scotts Valley, Calif.

[21] Appl. No.: 555,649

[22] Filed: Nov. 13, 1995

[51] Int. Cl.$^6$ ..................................... G11B 5/09
[52] U.S. Cl. ................... 360/48; 360/51; 360/64
[58] Field of Search ..................... 260/70, 51, 48, 260/64

[56] References Cited

U.S. PATENT DOCUMENTS

| | | |
|---|---|---|
| 2,750,449 | 6/1956 | Thompson et al. . |
| 2,900,444 | 8/1959 | Camras ..................... 360/70 |
| 2,924,668 | 2/1960 | Hoshino et al. . |
| 3,320,371 | 5/1967 | Bach . |
| 4,525,754 | 6/1985 | Handley ..................... 360/51 |
| 4,636,886 | 1/1987 | Schwarz ..................... 360/84 |
| 4,647,993 | 3/1987 | Schwarz et al. ............. 360/84 |
| 4,731,681 | 3/1988 | Ogata ....................... 360/85 |

FOREIGN PATENT DOCUMENTS

| | | | |
|---|---|---|---|
| WO 93/26005 | 12/1993 | WIPO | .................. 360/70 |
| WO 95/06940 | 3/1995 | WIPO | .................. 360/70 |
| WO 96/00437 | 1/1996 | WIPO | .................. 360/70 |

Primary Examiner—Andrew L. Sniezek
Attorney, Agent, or Firm—Lowe, Price, LeBlanc & Becker

[57] ABSTRACT

A method and arrangement that provides the proper timing for starting the search for a format timing mark on arcuate data tracks recorded by an arcuate scanner prevents mis-identification of the format timing mark caused by same azimuth interference. Mis-identification of the format timing mark is avoided by preventing reading of the signal from a first azimuth read head of arcuate scanner until the read head reaches a safe zone in its data track. The safe zone is a pad area written by a first azimuth write head, located on a data track between two pad sections of second azimuth data tracks written by second azimuth write heads. In the safe zone, it is not possible for the first azimuth read head to read two adjacent pad sections of the first azimuth written by two different first azimuth write heads. Once in the safe zone, the read signal from the first azimuth read head can be safely read to look for the format timing mark. Safe zones for each of the other read heads are similarly established between two pads of different azimuth. To assure that the read head is within the safe zone when the read signal is read by the read channel, a timing signal is precisely generated that causes the read channel to start searching for the format timing mark in the safe zone, this timing being based on a defined reference point on the recording tape.

6 Claims, 11 Drawing Sheets

Figure 1
PRIOR ART
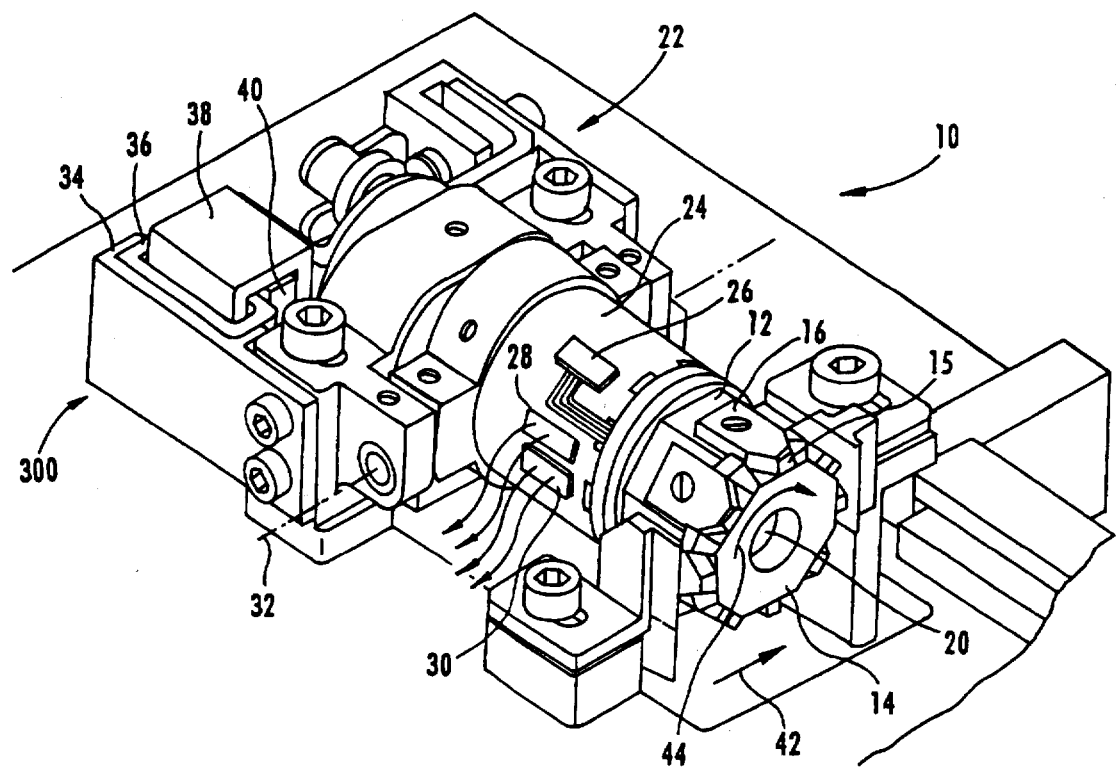
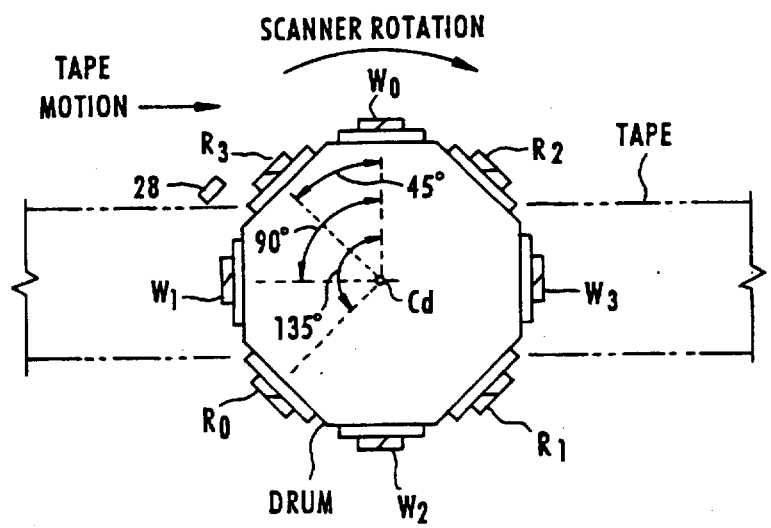
Figure 2
PRIOR ART

METHOD AND ARRANGEMENT FOR INITIATING SEARCH FOR START OF DATA IN ARCUATELY RECORDED DATA TRACKS

FIELD OF THE INVENTION

The present invention relates to the field of magnetic tape drives, and in particular, to the recognition of the start of data in data tracks recorded on a recording tape by an arcuate scanning tape drive.

DESCRIPTION OF THE RELATED ART

Conventional magnetic tape drive systems provide a reel-to-reel transport of magnetic tape past a fixed recording/reading location where a stationary single track or multiple-track head is positioned. Recording and playback are performed longitudinally with respect to the tape by moving the tape on its longitudinal axis past the stationary record/playback head mechanism. In the stationary head tape drive, a plurality of transversely-aligned heads are fixedly positioned with respect to the tape during recording and playback. The recording heads place a plurality of parallel longitudinally-extending tracks on the tape.

Rotary head tape drive systems provide higher capacity. In such systems, magnetic head mechanisms rotate relative to the moving storage tape. The most common rotary head system, first developed for video recording, utilizes a helical scan. The tape wraps around a drum tilted at an angle with regard to the direction of motion of the tape. The drum supports two or more heads. The combination of tape motion and drum rotation produces straight tracks recorded at an angle with respect to the length (longitudinal axis) of the tape.

The application of helical scanning to data storage systems has been limited. Helical scanning requires high-pressure contact between the tape and the drum. Repeated motion of the tape across the drum for large numbers of read and/or write operations for common computer data storage and retrieval purposes causes wear on the head parts and the tapes. Also, the helical scanning mechanism tends to be large, complex and expensive.

Another known type of rotary scanning technology, however, is arcuate scan technology. In arcuate scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

International Application WO 93/26005 to Lemke et al. discloses an example of an arcuate scanning tape drive for computer data storage. In the Lemke et al. arcuate scanning tape drive, a number of scanner heads are provided around the periphery of the circular planar surface. As the scanner rotates and the tape moves past the rotating scanner surface, the read and write heads alternately pass over the tape. The operation of the scanner is commutated or switched from "write" to "read" to alternatively activate the appropriate operation through alternate ones of the scanner heads.

The timing of the commutation is critical, so that the read and write heads are properly positioned over the tape when performing their read and write operations. Variations in timing of the write operation cause variations in the placement of the arcuate data tracks on the tape. If a drive reading the tape cannot detect and compensate for such variations, that drive may not recover all of the data from all of the tracks.

In order to properly commutate between the read/write operations of the scanner, and time these read/write operations, it is necessary to accurately determine the rotational position of the various scanner heads relative to a stationary (non-rotating) point. This stationary point (i.e. "rotational point") may be a scanner tachometer or tachometer index that the scanner heads pass as the scanner rotates. The position of the various heads relative to the scanner tachometer or tachometer index is used to time the various heads.

In order to read data from a data track, a "format timing mark" recorded on the tape by a write head immediately preceding the data is searched for by a read head. Once the format timing mark is recognized, the read channel will then begin processing the data that follows the format timing mark. It is important, however, that the format timing mark is correctly recognized before processing of the data is begun. Early mis-identification of the format timing mark will typically result in an error in reading the data, requiring error correction. This may lead to re-writing of a block of data or an entire track, severely penalizing the tape drive performance.

The possibility of mis-identification of the format timing mark may be raised by the manner in which data tracks are written on the tape, for example, if adjacent tracks are written by write heads of different azimuth. The data tracks may be recorded such that they have adjacent pad areas (preceding the format timing marks) that are recorded by write heads of the same azimuth. When a single read head simultaneously passes over the pad sections of two adjacent pads written by write heads of the same azimuthal orientation, and a search is started for the format timing mark at that point, same azimuth interference may cause a mis-identification of the format timing mark. This mis-identification erroneously starts the read channel to begin processing data too early, before the read head is actually over the data.

SUMMARY OF THE INVENTION

There is a need for a method and apparatus that provides the proper timing for starting the search for the format timing mark and prevents mis-identification of the format timing mark caused by same azimuth interference.

This and other needs are met by the present invention which avoids a misidentification of the format timing mark by preventing reading of the signal from a first azimuth read head of an arcuate scanner until the read head reaches a safe zone in its data track. The safe zone is a pad area written by a first azimuth write head, located on a data track between two pad sections of second azimuth data tracks written by second azimuth write heads. In the safe zone, it is not possible for the first azimuth read head to read two adjacent pad sections of the first azimuth written by two different first azimuth write heads. There is therefore no possibility of a mis-identification caused by same azimuth interference. Once in the safe zone, the read signal from the first azimuth read head can be safely read to look for the format timing mark. Safe zones for each of the other read heads are similarly established between two pads of different azimuth.

To assure that the read head is within the safe zone when the read signal is read by the read channel, it is necessary to accurately time when the search for the format timing mark starts. The timing is precisely established, in certain embodiments, by reference to a defined marking on the recording tape. Based on the timing developed in response to the detection of the defined marking, a timing signal is accurately generated that causes the read channel to start searching for the format timing mark.

With the precise timing to start the search for the format timing mark only when the read head is in its safe zone, the present invention provides a more reliable and higher performance tape drive, as the possibility of errors and error correction due to mis-identification of the format timing mark is greatly reduced.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 1 is a diagram of an arcuate scanner of a tape drive, operating in accordance with an embodiment of the present invention.

FIG. 2 is front view of the arcuate scanner head assembly, of the scanner of FIG. 1, showing the angular relationship of the read and write heads and the passage of a tape past the head assembly.

DETAILED DESCRIPTION OF THE ILLUSTRATIVE EMBODIMENTS

Figure 3:
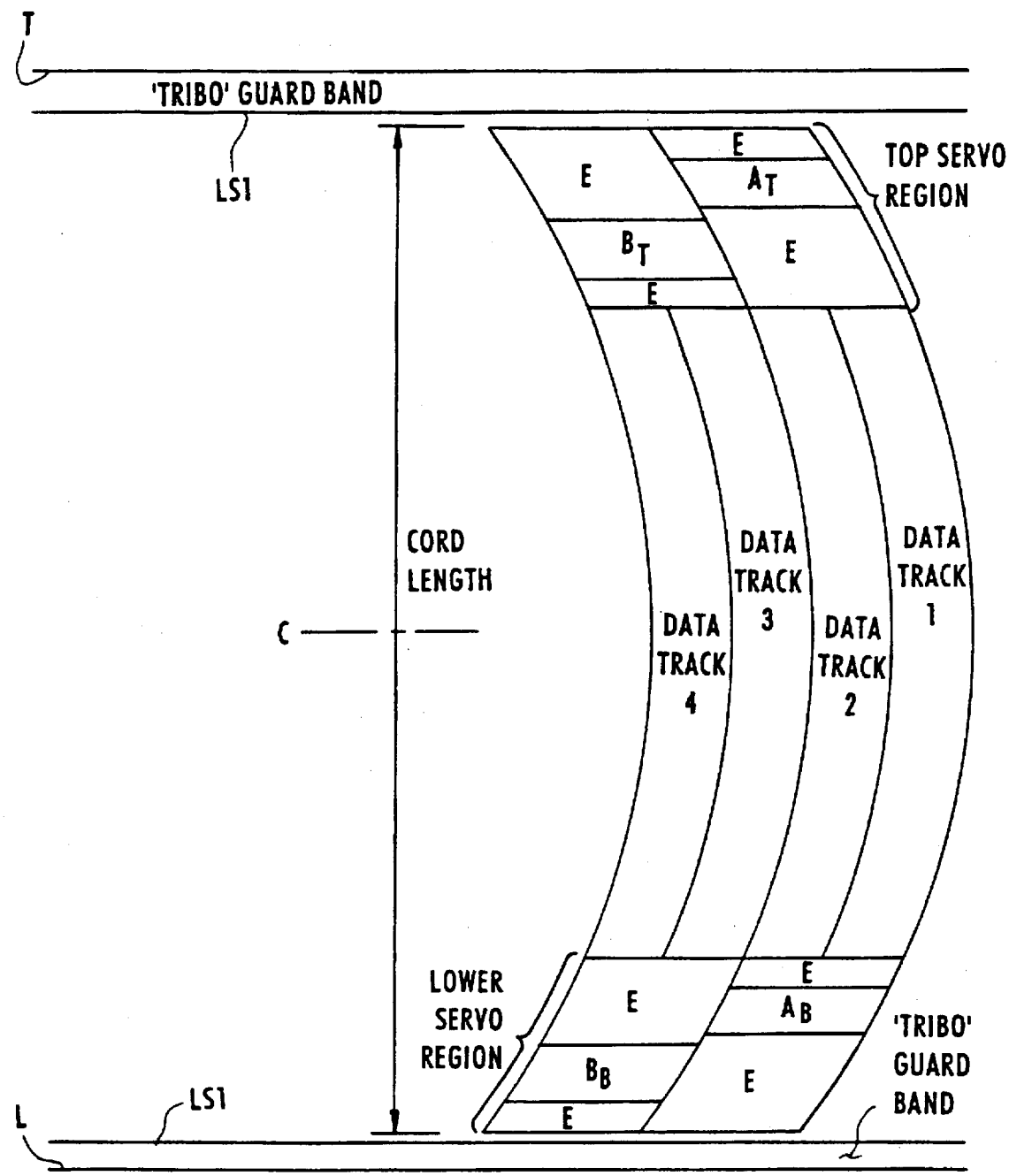
FIG. 3 is a diagram of the format of information recorded on the tape, when viewed through the tape toward the planar surface end of the arcuate scanner head assembly in FIG. 2.

FIG. 1 depicts a perspective view of an arcuate scanner head assembly (ASHA) 10 which writes and reads a sequence of arcuate tracks on a recording tape. The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece and a stator piece (not visible in the illustrated view). The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator. The housing 24 is essentially cylindrical and encloses the structure providing rotational power to the shaft 20.

The windings of the stator connect to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal for each full rotation of the shaft 20.

Two different types of angles are critical to proper reading and writing operations in arcuate scanners are discussed herein. The first type of angle relates to various rotational angles, i.e. of the various scanner heads, about the central axis of the arcuate scanner head assembly. Commutation functions are controlled as a function of the rotational angle relative to the index. The other critical angle is the tilt angle of the arcuate scanner head assembly. The tilt angle affects the alignment of the scanner with the tape.

The scanner 10 is positioned at a recording location so that the planar end face 14 of the drum 12 faces a tape on which a sequence of arcuate tracks is to be written or read. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

A tilt motor controls the angular tilting of the scanner 10 with respect to the tape. The tilt motor includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 pivots above the pivot axis 32 by an angular amount that depends upon the relative strengths of the voice coil 36 field and the field of the permanent magnet 40, thereby selectively positioning the axis of rotation on which the shaft 20 and drum 12 rotate.

Alternative embodiments of the present invention provide other tilt mechanisms, such as a servo motor, or oppositely directed magnetic coils, as appreciated by one of ordinary skill in the art. The present invention is not limited to controlling the tilting of the scanner to control the pointing of the scanner at the recording tape. Other embodiments of the invention provide other methods of controlling the pointing position of the scanner head relative to the tape. These include controlling the elevation of the scanner with an elevator mechanism, or providing a side swing mechanism for the scanner, as one of ordinary skill in the art will appreciate.

FIG. 2 is a view through a tape at the reading location towards the planar end face of the ASHA scanner drum. As shown, there are eight transducers mounted with their active surfaces extending slightly through a plane at the end face of the drum. Four transducers are designated as write transducers and are identified as $W_0$, $W_1$, $W_2$ and $W_3$. In addition, there are four read transducers identified as $R_0$, $R_1$, $R_2$ and $R_3$. Identical subscripts identify write/read transducer pairs in which the track written by transducer $W_1$ is later read by transducer $R_1$. Further, the write transducers are accurately spaced on the drum by 90° in the order in which they write tracks on the tape, which is $W_0$, $W_1$, $W_2$ and $W_3$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$.

The sequence traced across the tape from edge to edge when the scanner rotates in the direction indicated in FIG. 2 is: $W_0$, $R_3$, $W_1$, $R_0$, $W_2$, $R_1$, $W_3$, $R_2$. Write heads $W_0$ and $W_2$ are oriented to write at a first azimuth angle on the tape, and read heads $R_0$ and $R_2$ read information recorded at the first azimuth angle. Write heads $W_1$ and $W_3$ are oriented to write at a second azimuth angle on the tape, and read heads $R_1$ and $R_3$ read information recorded at the second azimuth angle. As thus described, when the tape speed is matched to an appropriate rotational velocity of the drum, the write transducers, when energized, will trace a sequence of contiguous recorded arcuate tracks with alternating azimuthal orientation. Similarly, the read heads sense recorded information from a sequence of arcuate tracks with alternating azimuthal orientation.

FIG. 3 shows the preferred format of the information on the developed tape in somewhat simplified form, as viewed through the tape looking towards the end face of the ASHA scanner drum in FIG. 2. It should also be noted that the various regions on the tape are not drawn to scale. A more detailed depiction of the format and a description of the format will be described later with respect to FIGS. 11A–11E and FIG. 12.

As shown in FIG. 3, the 'TRIBO' interface standard specifies a region along the top edge T of the tape as a guard band. A similar guard band extends along the lower edge L of the tape. The top guard band typically is 15 mils wide, and the lower guard band typically is 10 mils wide. Each TRIBO guard band extends for the full length of the tape. The arcuate scanner type data recording system will not write data in the guard bands.

Along the inner edge of each guard band is a magnetic stripe, designated an LS1 stripe. The manufacturer deeply records the LS1 stripes along the entire length of the tape. The present invention utilizes the lower LS1 stripe as a reference point. The upper LS1 stripe is not strictly necessary for the present invention, but it is included in certain embodiments.

The recorded sections of the tape are spaced from the upper and lower guard bands and LS1 stripes by a specified distance, e.g. 1.0 mils.

The actual data tracks are bounded by a top servo region and a lower servo region. Within these regions bursts A and B of servo frequency signals are recorded at predetermined locations. During the writing operation, the scanner writes predetermined amounts of erase signals before and after the respective servo bursts. During a subsequent read operation, a predetermined read head partially overlaps data tracks in such a manner that it detects differing predetermined amounts of the A and B servo bursts during different time windows. The scanner system uses comparisons of the detected amplitudes of the various A and B servo bursts as a servo control, e.g. for servo control of tape speed and/or ASHA tilt angle.

In accord with certain embodiments of the present invention, all timing and orientation functions for servo control, data read commutation, and data write sampling are based on detection of the lower LS1 stripe and various known positional relationships between the ASHA components.

The recorded information on the tape forms arcs. A straight line across an arc, extending from one end to the other, forms a chord. For a tape of a given width having known guard bands and predetermined spacing from the edges of the guard bands, the chord length becomes a known value. For example, for common quarter inch magnetic recording tape, the tape is typically about 247 mils wide. The top guard band is 15 mils, the lower guard band is 10 mils, the desired spacing from the top guard band is 1 mil, and the desired spacing from the lower guard band is 1 mil. The chord length therefore should be about 220 mils.

During both reading and writing to the tape, it is critical to maintain alignment of the center of the ASHA with the center of the information recording area, shown as center line C in FIG. 3. This center line C passes through the center of the chord length of each recorded arc. Because of the differences in the guard band dimension, the center line C does not coincide with the physical center line of the tape. In the above example, the chord length is 220 mils. The center of the chord is 110 mils from either end of the arc, or approximately 111 mils above the lower LS1 stripe.

Figure 4:
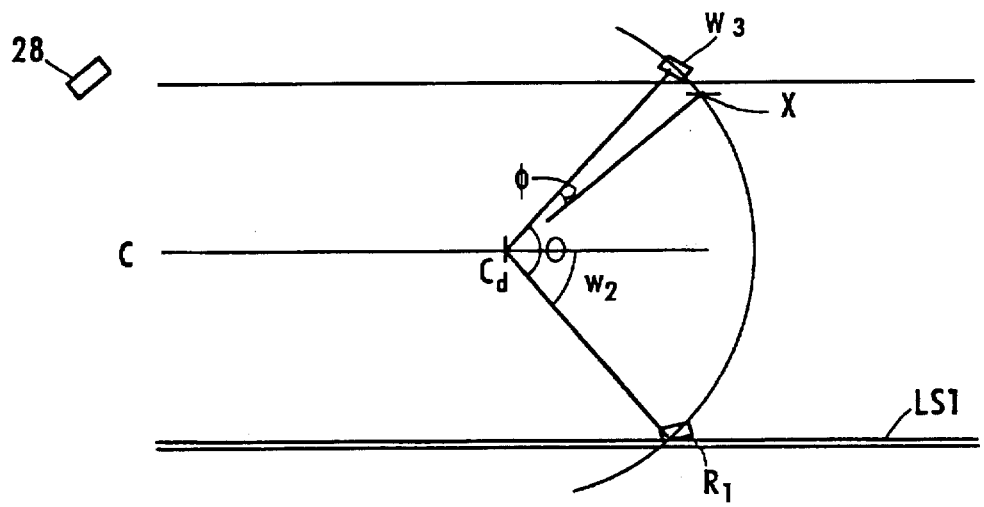
FIG. 4 is a simplified diagram of the format and the geometric relationship thereof to a read head and a write head.

With reference to FIG. 4, the center of rotation $C_d$ of the ASHA is aligned with the centerline C of the information region of the tape. The angles between the various read and write heads are known and the position thereof can be calculated in relation to the index sensor 28. In accord with the present invention, each write head is activated a predetermined period $T_0$ after a read head bearing a known angular relationship to the write head crosses the lower LS1 stripe.

Assuming the head arrangement illustrated in FIG. 2, the read head $R_1$ crosses the tape followed by the write head $W_3$. The crossing of the read head $R_1$ over the LS1 stripe along the lower guard band produces a pulse output from that head. The write head $W_3$ is offset by a known angle $\theta$ from the read head $R_1$, for example by approximately 45° in the ASHA embodiment illustrated in FIG. 2. This angle will vary slightly from one head assembly to another, but for a particular head assembly, this angle will remain constant for the entire useful life of the head assembly.

From the radius of rotation of the head and the chord length of the desired information recording arc, it is possible to calculate the angle $\Phi$ that the write head $W_3$ must travel through before reaching the desired top of the information arc (see FIG. 3). The rotational speed of the ASHA also is known, therefore, a microcontroller can calculate a transit delay $T_0$ required for the write head $W_3$ to travel from the position shown in FIG. 4 (when the read head $R_1$ crosses the lower LS1 stripe) until the write head $W_3$ reaches the point X on the tape at which that head should begin a writing operation. The microcontroller therefore activates the write head W·after a delay of $T_O$ following the detection of the lower LS1 stripe by the read head $R_1$.

Figure 5:
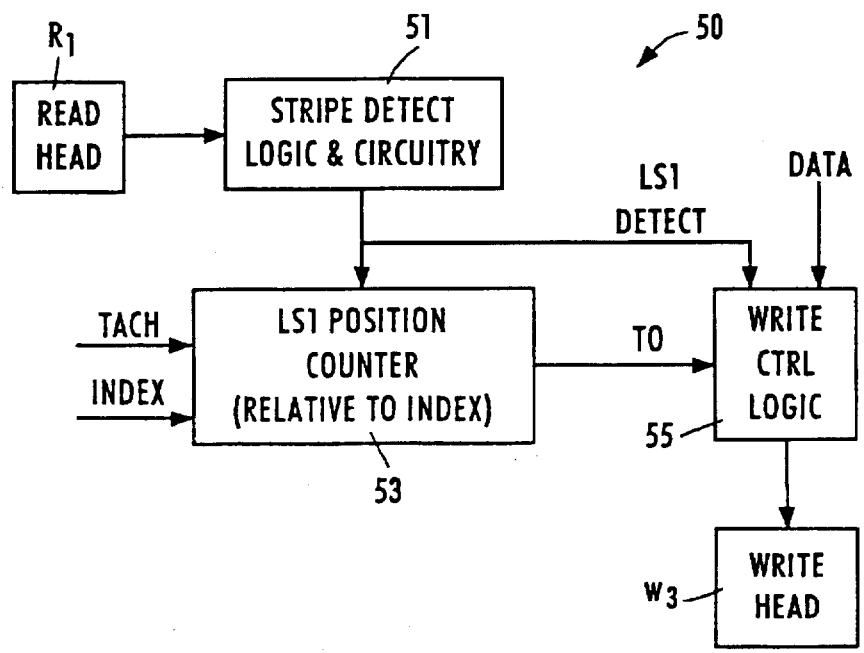
FIG. 5 is a functional/logic diagram of the control of a write operation in accord with an embodiment of the invention.

FIG. 5 is a simplified functional block diagram of the control loop 50 for controlling the write head commutation. For simplicity of discussion, only one read head and only one write head are shown, but it will be readily apparent that similar processing occurs during a write operation for the other heads on the ASHA. As shown, the read head $R_1$ supplies a detection signal to stripe detection logic and filter circuitry 51. The stripe detection logic and circuitry 51 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 51 will differentiate between the two, for example based on a timing or sequence analysis.

The stripe detection logic and circuitry 51 supplies the LS1 detection pulse signal to a microcontroller (not shown in detail). Within the microcontroller, a microcode process is running to count position pulses relative to index to identify the LS1 position relative to the index. This microcode routine appears at reference numeral 53 in FIG. 5. The stripe detection logic and circuitry 51 supplies the LS1 detection pulse signal to the position counter routine 53, and the routine 53 calculates a delay time $T_O$ for the transit of the next write head W·to the point X for the start of its write operation, as outlined above relative to FIG. 4. The LS1 position counter routine 53 produces a clock count value representing the number of clock pulses equal to the necessary time delay $T_o$.

The stripe detection logic and circuitry 51 also supplies the LS1 detection pulse signal to write control logic 53. The write control logic 55 may be a separate circuit or another microcode routine running on the microcontroller. Also, the LS1 position counter routine 53 supplies the clock count value representing the number of clock pulses equal to the necessary time delay $T_O$ to the write control logic 55. The write control logic 55 counts the specified number of clock pulses equal to the necessary time delay $T_O$ following the LS1 detection pulse, and at that time, activates the write head $W_3$ to initiate its write operation.

The microcontroller also provides servo signals, erase signals and data to the write head to write data on the tape in the sequence required to achieve the format shown in FIG. 3. All of the write sequence operations are referenced back to the pulse detected when the read head $R_1$ crossed over the lower LS1 stripe.

The interpretation of read head signals is similarly timed in relation to the LS1 stripe detection. Since the angle between read heads is known (FIG. 2), the signal processing circuitry is activated to begin sampling and interpreting signals from the next read head when that read head reaches the appropriate position X over the tape. The control functionality is virtually identical to that used to activate the operation of the write head $W_3$ discussed above. In a read operation, various timing windows are defined by the microcode of the microcontroller. These windows for each read head are referenced to an earlier crossing of a read head over the lower LS1 stripe. The specific operation and timing related to searching for a format timing mark, that indicates to the read channel to begin processing a block of data, will be described later.

As a general example of the timing for a read, the servo burst $A_T$ is written in a particular section of the tape, and bounded by specified amounts of erase signal (E). The third read head $R_3$ is located at an angle of 90° with regard to the second read head $R_2$. During a read operation, the circuitry responsive to the signals from the third read head $R_3$ are time indexed to the pulse signal indicating the passage of head $R_2$ over the lower LS1 stripe. In the example, a time window is defined with reference to that LS1 crossing when the circuitry will sample for the $A_T$ servo burst. Similar time windows are defined for detecting the second top servo burst $B_T$, the bottom server bursts $A_B$, $B_B$ and various format timing blocks within the data tracks.

As shown by the above discussion of the present invention, in certain embodiments, all critical timing of the write and read operations are referenced to the lower LS1 stripe. The processes of writing the LS1 stripes on the tape, however, are subject to imperfections. A manufacturer executes a single run or pull of the tape longitudinally past heads to write the LS1 stripes on the tape. Other regions of the tape remain blank until written thereon by an arcuate scanner. The tape may wander during the LS1 stripe writing operation, the tape width may vary slightly, the tape may vibrate, the tape may stretch laterally, etc. As a result, the lower LS1 stripe may wander somewhat over the length of the tape.

Figure 6:
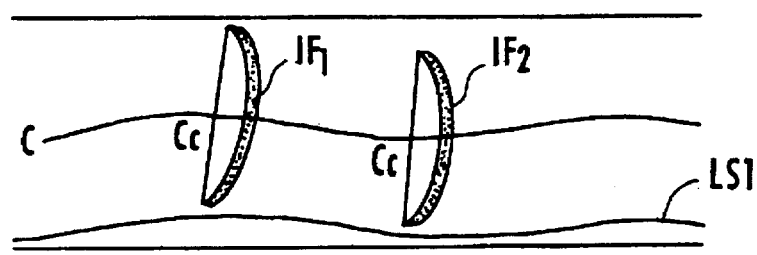
FIG. 6 is an exaggerated representation of vertical variations in track placement.

In accord with a second aspect of the present invention, the tilt angle of the ASHA is also referenced to the lower LS1 stripe. As the LS1 stripe wanders, the write operation referenced to that stripe will also wander. FIG. 6 provides a somewhat exaggerated representation of a developed tape showing the wander of the lower LS1 stripe and the corresponding variations in placement of the formatted information. As shown, at locations where the lower LS1 stripe is slightly higher in relation to the bottom edge of the tape, the write head will place the written format information $IF_1$ at a correspondingly higher position on the tape. At such locations, the chord center $C_c$ is higher. At locations where the lower LS1 stripe is slightly lower in relation to the bottom edge of the tape, the write head will place the written format information $IF_2$ at a correspondingly lower position on the tape. At such locations, the chord center $C_c$ is lower. The line formed by the centers of the arcs (C in FIG. 3) is no longer straight, instead the center line wanders in the same manner as the lower LS1 stripe. At any given point, however, the distance from LS1 to the center line C remains approximately constant.

Figure 7:
FIG. 7 provides a simplified illustration of the geometrical relationship of the arcuate scanner head assembly to the tape format from a side view, helpful in explaining another aspect of the invention.

Based on reference to the LS1 stripe, the axis of rotation of the ASHA $C_d$ is kept in alignment with the center line C formed by the arc centers, to compensate for drift of the lower LS1 stripe. FIG. 7 provides a lateral view of the relevant geometry. The ASHA is effectively aimed by adjusting the tilt angle ω about the axis 32, as discussed above relative to FIG. 1. The tilt angle is servo controlled in response to detection of the lower LS1 stripe by one of the read heads, such as read head $R_1$. In the lateral direction, the tilt angle ω is adjusted in response to detection of the lower LS1 stripe to keep the angle $ω_1$ of the read head from the axis $C_d$ constant.

FIG. 4 can be referenced to explain how this operation works. For a given arc length or chord length, the angle $ω_2$ between the center of rotation $C_d$ and the point at which a specific read head, e.g. $R_1$, crosses the lower LS1 stripe is a known constant.

The intent is to align the center of rotation $C_d$ of the ASHA with the center of the information arc (i.e. at a particular point on the wandering center line C). The relationship of the lower LS1 stripe to the information arc is known. Assuming the centers are aligned at $C_d$ in FIG. 4, then the angle $\omega_2$ represents the angle of head rotation from the center of the information arc to the crossing of LS1. Typically this angle corresponds to one half the arc angle plus some small amount for the spacing between the arc and the lower LS1 stripe. In accord with the present invention, variations in the angle $\omega_2$ (e.g. measured with reference to the index 28) are used to produce an error signal to adjust the tilt angle $\omega$ to maintain the desired alignment.

Figure 8:
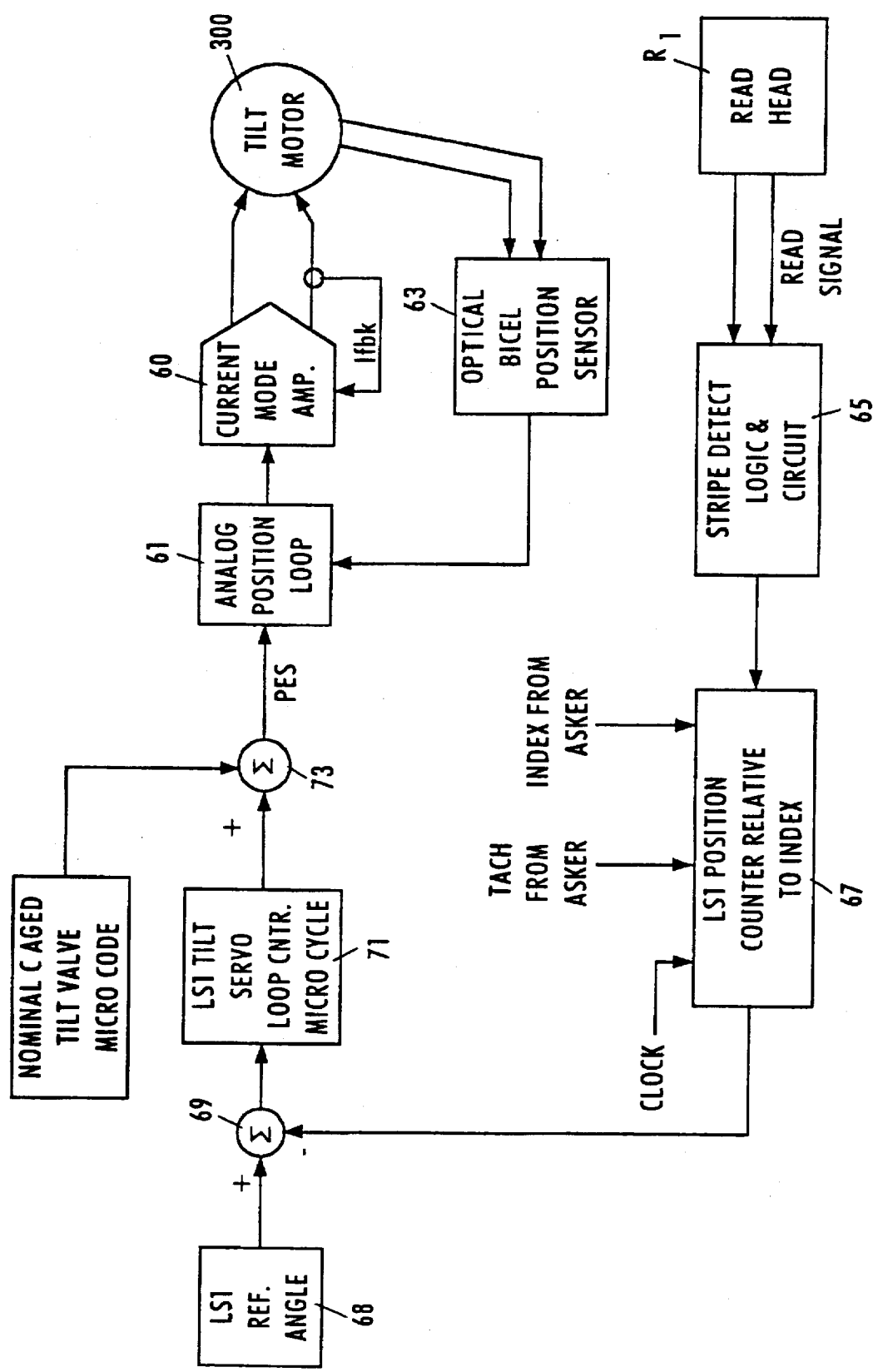
FIG. 8 is a functional/logic diagram of the control of a write operation in accord with another aspect of the invention.

FIG. 8 is a simplified functional block diagram of the control loop for controlling the tilt angle. For simplicity of discussion, this drawing shows only one read head, but it will be readily apparent that similar processing occurs with respect to other heads on the ASHA.

The ASHA 10 has a tilt motor 300, for example, comprising the elements 34, 36, 38 and 40 of FIG. 1. The tilt motor 300 responds to signals from a current mode amplifier to adjust the tilt angle of the ASHA 10. An analog position loop 61 provides a control current signal to the current mode amplifier 60. An optical position sensor 63 detects the actual position of the ASHA produced by the tilt motor 300 and supplies a position sensor signal to the analog position loop 61. The analog position loop 61 also is responsive to a position error signal (PES) produced in accord with the second aspect of the present invention. More specifically, the position error signal represents an error in the angle $\omega_2$ shown in FIG. 7.

The tilt control of the present invention operates during both read and write operations to maintain proper alignment. Consider first a write operation.

In operation, one of the read heads crosses the lower LS1 stripe, e.g. read head $R_1$. The read head $R_1$ supplies signals to stripe detection logic and associated circuitry 65 The stripe detection logic and circuitry 65 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 65 will differentiate between the two, for example based on a timing or sequence analysis.

The stripe detection logic and circuitry 65 supplies the LS1 pulse signal to a microcontroller (not shown in detail). Within the microcontroller, a microcode process is running to count position pulses relative to index 28 to identify the LS1 position relative to the index. This microcode routine appears at 67 in FIG. 8 and is similar to the routine 53 discussed above with regard to FIG. 5. The LS1 position routine 67 receives the LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the LS1 crossing relative to the index.

The count values for the current position are applied to the negative input of a summation circuit 69. The summation circuit 69 also receives coarse and fine values for a reference angle 68 for the LS1 crossing relative to the index.

The summation circuit produces a difference or error signal, representing the difference between the measured LS1 position relative to index and the reference LS1 position relative to index. The summation circuit 69 supplies this error signal to another microcode routine 71 of the microcontroller. This routine is the LS1 tilt servo loop control microcode.

The microcode routine 71 produces an analog position error signal (D/A converter not shown) which is summed with a reference analog position signal in a second summation circuit 73. The result of this summation goes to the analog position loop 61 as the position error signal (PES). As the LS1 stripe moves up and down during the writing operation, the loop control of FIG. 8 adjusts the current applied to the tilt motor 300 to keep the LS1 angle $\omega_2$ constant as measured with respect to the angular rotation index of the ASHA.

If all of the tracks are written using the closed loop control of FIG. 8, then the tracks all end a specified distance (e.g. 1 mil) above the lower LS1 stripe. The same loop operates to control the tilt angle during the reading operation. In the reading operation, the tilt tracking loop can also be fine tuned to exit and enter tracks at the center of the tracks. For this purpose, the LS1 tilt servo is modulated based on a servo loop detection of the A and B servo pulses.

Although shown and explained separately, for ease of understanding, in actual operation the head commutation timing and the tilt angle control described above occur as part of the ongoing control operations of the ASHA during each and every read cycle and write cycle executed through the ASHA. As such, the activation of the write heads, the interpretation of the read head outputs and the tilt angle alignment of the ASHA with respect to the center of each data arc all are referenced to a common point on the tape, the crossing point of a read head over the lower LS1 stripe.

Figure 9:
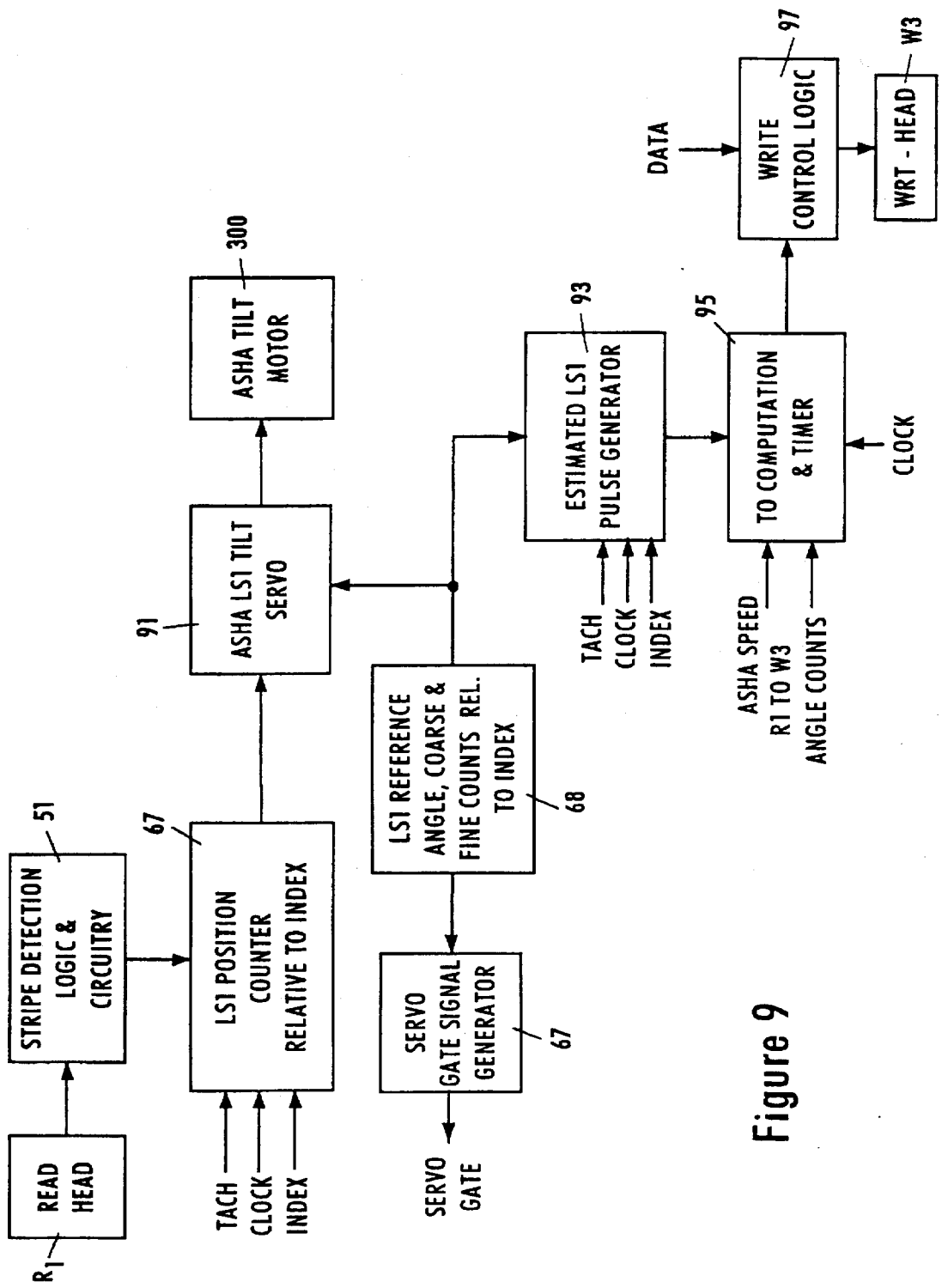
FIG. 9 is a functional/logic diagram of an exemplary embodiment of the tilt angle control and write commutation control in accord with the present invention.

FIG. 9 depicts the most exemplary embodiment of the control circuitry in accord with the present invention. The embodiment of FIG. 9 differs from that of FIGS. 5 and 8 in that it provides both tilt angle control and write commutation control in one circuit. Also, the control circuit of FIG. 9 references the commutation functions to an estimated lower LS1 detection event, rather than directly to an actual lower LS1 detection. Occasionally, the detection circuitry will miss the lower LS1 stripe detection. The tilt angle control elements will maintain the tilt angle at the last value for that angle. The lower LS1 estimation will still provide the necessary commutation timing reference. A more detailed discussion of this embodiment follows.

Several of the components shown in FIG. 9 are the same as components appearing in the earlier drawings, and those elements are indexed by the same reference numerals used in the earlier drawings.

Figure 10:
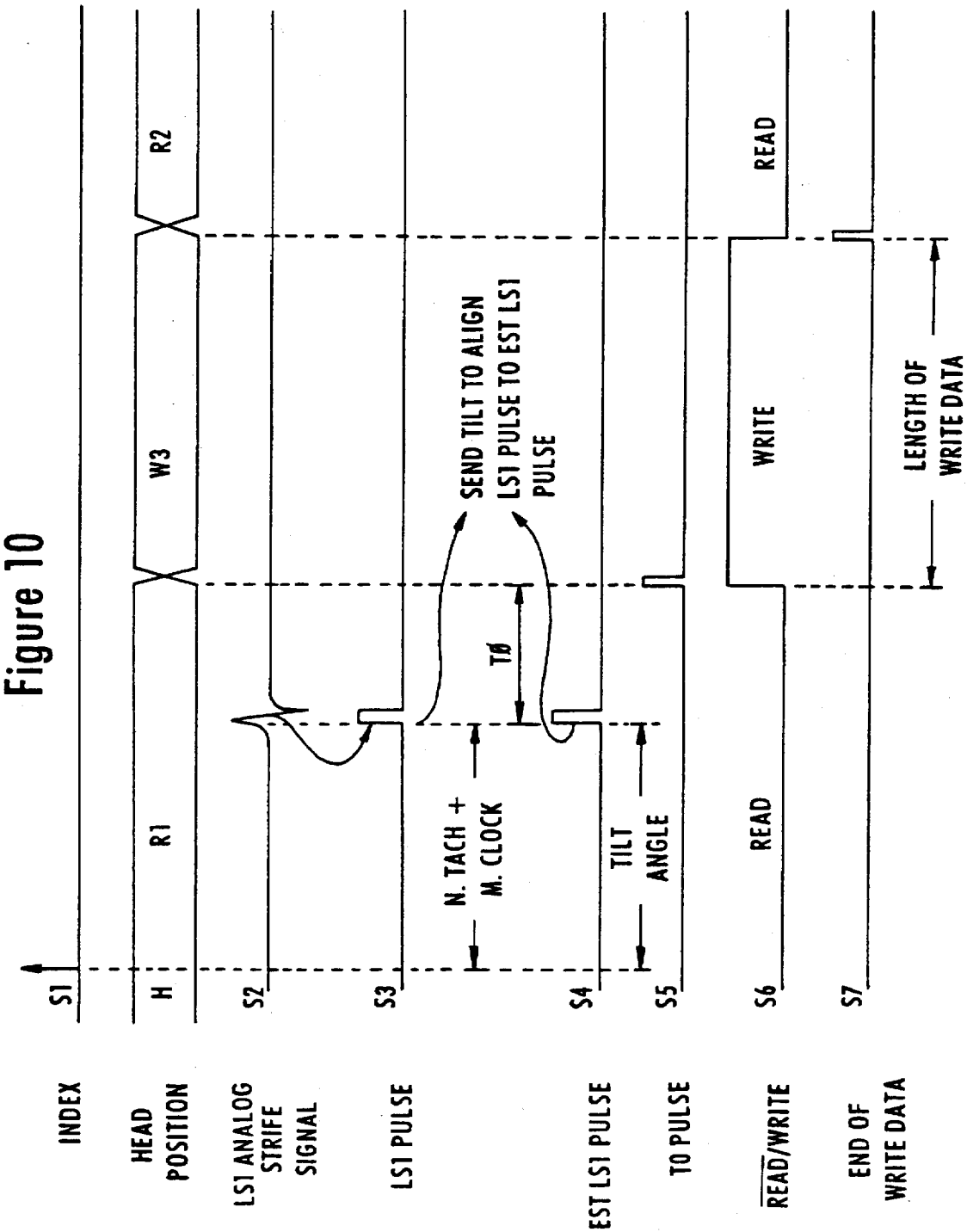
FIG. 10 is a timing diagram helpful in understanding operation of the system when controlled in the manner illustrated in FIG. 9.

FIG. 10 illustrates the timing of events and signals during control in accord with FIG. 9, and the following description will refer to both FIG. 9 and FIG. 10. In FIG. 10 the processing logically begins with an S1 signal indicating detection of the index. The second line H in FIG. 10 shows the times during which the various heads pass the tape.

As in the earlier embodiment, the read head $R_1$ supplies a detection signal to stripe detection logic and filter circuitry 51. Passage of the head over the lower LS1 stripe produces an analog pulse waveform as shown at S2 in FIG. 2. The stripe detection logic and circuitry 51 converts that analog impulse into a digital level type pulse signal (S3). As shown, the timing of the pulse signal (S3) coincides with the passage of the read head $R_1$ over the magnetized lower LS1 stripe.

With reference to FIG. 9, the stripe detection logic and circuitry 51 supplies the lower LS1 detection pulse signal to a microcontroller (not shown in detail). Within the microcontroller, a microcode process 67 is running to count position pulses relative to index 28 to identify the lower LS1 position relative to the index. The LS1 position routine 67 receives the lower LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the lower LS1 crossing relative to the index.

In the embodiment of FIG. 9, the coarse and fine count values for the position of the lower LS1 crossing relative to the index and the coarse and fine count values for the LS1 reference position 68 go to an ASHA LS1 tilt servo circuit 91. The circuit 91 controls the tilt motor 300 and generally comprises the elements shown in FIG. 8 not reproduced in FIG. 9, e.g. the summation circuit 69, the loop control 71, the summation circuit 73, the nominal caged tilt value microcode, the position loop 61, the amplifier 60 and the position sensor 63. The ASHA LS1 tilt servo circuit 91 controls the tilt motor 300 to maintain a constant rotational angle of the head R1 with respect to crossing of the lower LS1 stripe, when measured relative to the index, in the same manner as discussed above in detail relative to the embodiment of FIG. 8.

The coarse and fine count values for the LS1 reference position also go to a servo gate signal generator 87 that asserts a servo gate signal to a tape drive controller (FIG. 13) to toggle the operation of the read channel between a servo mode and a data mode, in which the format timing mark is searched for and data is processed after the format timing mark is recognized. When the servo gate signal is deasserted, after the data in the data track has been read, the read channel again enters the servo mode to read the servo bursts at the bottom of the data track.

The coarse and fine count values for the LS1 reference position 68 also go to a pulse siginal generator 93. The generator 93 generates a pulse at a time after index estimated to coincide with crossing of the lower LS1 stripe by the read head $R_1$, as shown at S4 in FIG. 10. If the tilt angle is controlled as discussed above to keep the rotational reference angle constant, then the estimated lower LS1 pulse (S4) should coincide with the actual lower LS1 detection pulse (S3), as shown by comparison of those signals in FIG. 10.

However, the pulse output by the generator 93 is not dependent directly on actual lower LS1 stripe detection. If the system misses the lower LS1 stripe for a cycle or two, for some reason, the pulse generator 93 continues to output the pulse at the appropriate time after the index signal; and the write control logic 55 continues to activate the write heads to write the various forms of information on the recording tape.

The estimated LS1 pulse generator 93 outputs the pulse (S4) to a timer circuit 95. The timer circuit 95 receives an ASHA speed or tachometer signal (revolutions per minute) and the clock signal. The timer circuit 95 also receives an angle count ($R_1$ to $W_3$) representing the transit time $T_o$ for the head $W_3$ to travel from its position when the head $R_1$ crosses the lower LS1 stripe to the position at which that write head should begin writing. The timer circuit 95 receives the angle count value from an appropriate microcode routine running in the microcontroller. This routine may be responsive to actual lower LS1 crossing detections, as in the earlier embodiment. The timer 95, however, utilizes the last $T_o$ count value it received. Therefore the operation of the timer 95 is not interrupted by a temporary loss of detection of the lower LS1 stripe crossing.

The write control logic 97 passes data and other signals to the write head in response to the pulse signal (S5) from the timer circuit 95. Line S6 in FIG. 10 shows the write interval initiated by the pulse S5. At the end of a write operation interval, the logic circuit 97 terminates the write operation, as shown by the pulse signal S7 in FIG. 10.

As in the earlier embodiments, the various sequencing operations within one write cycle, e.g. to write servo signals, data, etc., also are controlled in reference to the lower LS1 stripe. In this embodiment, however, the tilt angle is controlled directly in response to the lower LS1 stripe detection to maintain a constant reference angle between the index and the point of rotation of the read head to detect that stripe. When that angle is constant, the LS1 detection coincides with the estimated LS1 pulse. The actual timing functions within the write sequence, however, are controlled in response to the estimated LS1 detection pulse. The timing functions relevant to read operations can be controlled in a similar manner.

FIGS. 11A to 11D together illustrate the recording of a sequence of tracks on the tape in accord with the present invention. For convenience of illustration, these drawings do not show the curvature of the arcuate tracks. The various write heads are approximately twice as wide as the desired data track width in the direction of the longitudinal tape axis.

Two of the write heads $W_0$ and $W_2$ write servo information and data. The other two write heads $W_1$ and $W_3$ write only data information. During reading operations, the read heads $R_0$ and $R_2$ read servo information and data, and the read heads $R_1$ and $R_3$ read only data information. As noted above, the write heads $W_0$ and $W_2$ are oriented to write at a first azimuth angle on the tape, and read heads $R_0$ and $R_2$ read information recorded at the first azimuth angle. Write heads $W_1$ and $W_3$ are oriented to write at a second azimuth angle on the tape, and read heads $R_1$ and $R_3$ read information recorded at the second azimuth angle.

Figure 11A:
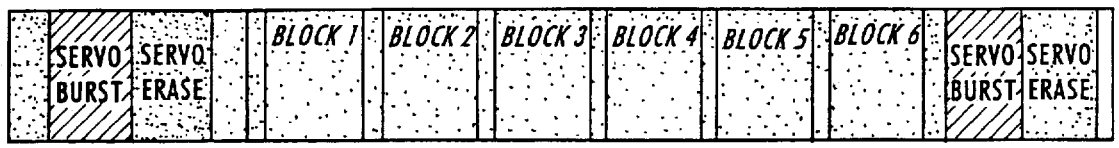
FIGS. 11A to 11D illustrate the process of writing a sequence of four tracks on the tape, to produce an information format in accord with the present invention.

In FIG. 11A, the first write head $W_0$ passes down across the tape (left to right in the drawing) and records a sequence of signals on the tape, as shown. First the write head $W_0$ records a pad of erase signal information at frequency f. Next, the write head $W_0$ records a predetermined burst of servo frequency signal. The servo frequency signal preferably is produced by dividing the erase frequency signal by an even integer, for example, the servo frequency could be f/4. The servo burst is written at a specific location on the track. In the first write operation, this first servo burst is in the top servo region and within that region is nearer to the top edge of the information area on the tape. This first top servo burst is designated as servo '$A_T$' (See FIG. 3).

After the servo burst $A_T$, the first write head $W_0$ records another predetermined amount of the erase signal to fill the remaining portion of the top servo region for the present recording pass. At this point, the write head $W_0$ reaches a point on the tape where data should begin. The scanner system controller therefore supplies data to the write head $W_0$, and that head begins recording the data on the tape. The head records a pad, followed by six blocks of data separated by pads, and a final pad. FIG. 11E, discussed later, shows the format of each data block in detail.

After writing the data, the first write head $W_0$ reaches the lower servo region. In this region, the write head $W_0$ records a pad of erase signal information at frequency f followed by another predetermined burst of servo frequency signal, e.g. at f/4. This lower region servo burst is located nearer to the recorded data than to the bottom of the information recording area and is designated as servo '$A_B$'. After the lower servo burst $A_B$, the write head $W_0$ records another erase signal pad to complete the lower servo region. At this point, the scanner system controller deactivates the writing operation through the first write head $W_0$, approximately 1 mil above the lower LS1 stripe.

The first write head $W_0$ writes all of the information shown in FIG. 11A at a first azimuth angle with regard to the longitudinal axis of the tape. All information recorded at that angle is readable by read heads oriented at the same azimuth angle, e.g. read heads $R_0$ and $R_2$.

The second write head $W_1$ passes down over the tape. The second write head $W_1$ does not write any information in the servo regions, this write head writes only data (see FIG. 11B). More specifically, when the write head $W_1$ reaches the position on the tape where data should begin, the scanner system controller supplies data to the write head $W_1$, and that head begins recording the data on the tape. The drawing shows this data track as a 'non-servo track'. In the non-servo track, the second write head $W_1$ records a pad, followed by six blocks of data separated by pads, and a final pad.

The width of the write heads is approximately twice the final track pitch or width. The information written by the first write head $W_0$ is the same width as that head and therefore is approximately two tracks wide. When the second write head $W_1$ begins writing, the tape has moved only one track pitch. As shown, the second write head $W_1$ writes the second track of data overlapping the first track of data by a predetermined amount, e.g. about fifty percent.

Figure 11B:
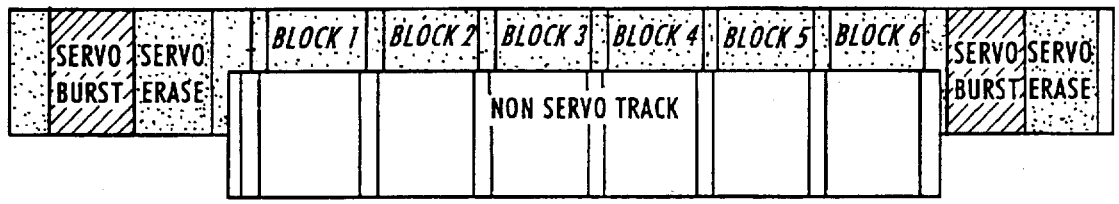

The second write head $W_1$ writes the non-servo track of data shown in FIG. 11B at a second azimuth angle with regard to the longitudinal axis of the tape. All information recorded at that angle is readable by read heads oriented at the same azimuth angle, e.g. read heads $R_1$ and $R_3$.

Figure 11C:
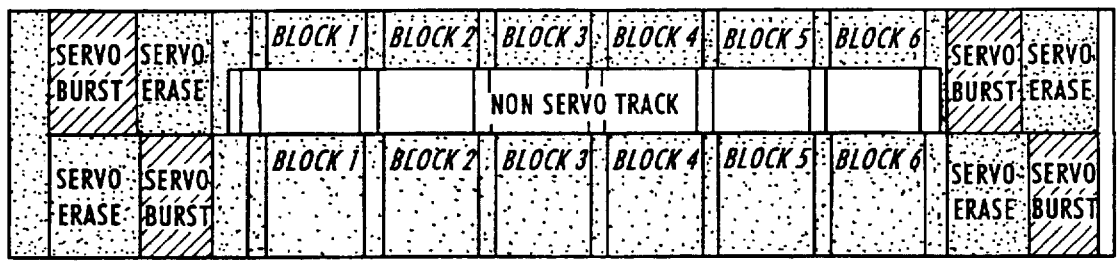

In FIG. 11C, the third write head $W_2$ passes down across the tape (left to right in the drawing) and records a sequence of signals on the tape. This sequence of signals is similar to those recorded by the first write head $W_0$, but as discussed below, the servo bursts are located at different points.

The third write head $W_2$ records a pad of erase signal information at frequency f. Next, the write head $W_2$ records a predetermined burst of servo frequency signal, e.g. f/4. The servo burst is written at a specific location on the track. In the this the third write operation, the servo burst within the top servo region is nearer to the top of the data recording area than to the top edge of the information area on the tape. This top servo burst is designated as servo '$B_T$' (see FIG. 3).

After the servo burst $B_T$, the third write head $W_2$ records another predetermined amount of the erase signal (relatively small) to fill the remaining portion of the top servo region for the present recording pass. At this point, the write head $W_2$ reaches a point on the tape where data should begin. The scanner system controller therefore supplies data to the third write head $W_2$, and that head begins recording the data on the tape. The head records a pad, followed by six blocks of data separated by pads, and a final pad.

After writing the data, the third write head $W_2$ reaches the lower servo region. In this region, the write head $W_2$ records a pad of erase signal information at frequency f followed by another predetermined burst of servo frequency signal, e.g. at F/4. This lower region servo burst is located nearer to the lower edge of the information recording area on the tape and farther from the recorded data and is designated as servo '$B_B$'. After the lower burst servo burst $B_B$, the third write head $W_2$ records another erase signal pad to complete the lower servo region. At this point, the scanner system controller deactivates the writing operation through the third write head $W_2$, approximately 1 mil above the lower LS1 stripe.

When the third write head $W_2$ begins its operation, the tape again has moved a distance of approximately one track pitch. The third write head $W_2$ therefore writes the third track overlapping the second track by approximately fifty percent. The third write head $W_2$ writes all of the information shown in FIG. 11C at the first azimuth angle with regard to the longitudinal axis of the tape. All information recorded at that angle is readable by read heads oriented at the same azimuth angle, e.g. read heads $R_0$ and $R_2$.

Figure 11D:
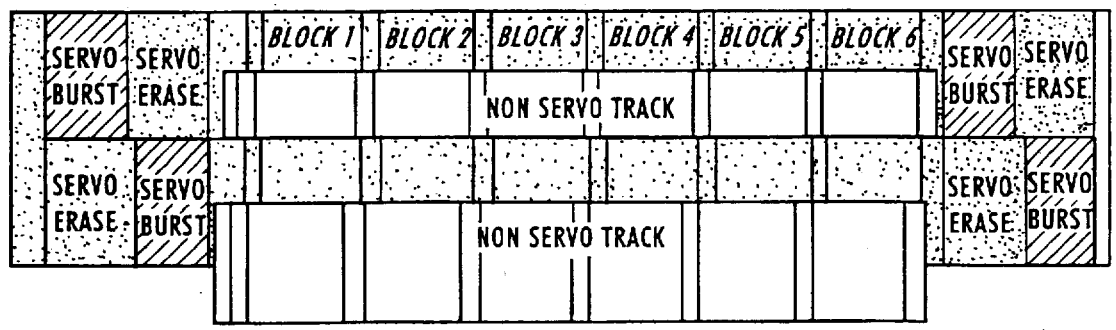
Figure 11E:
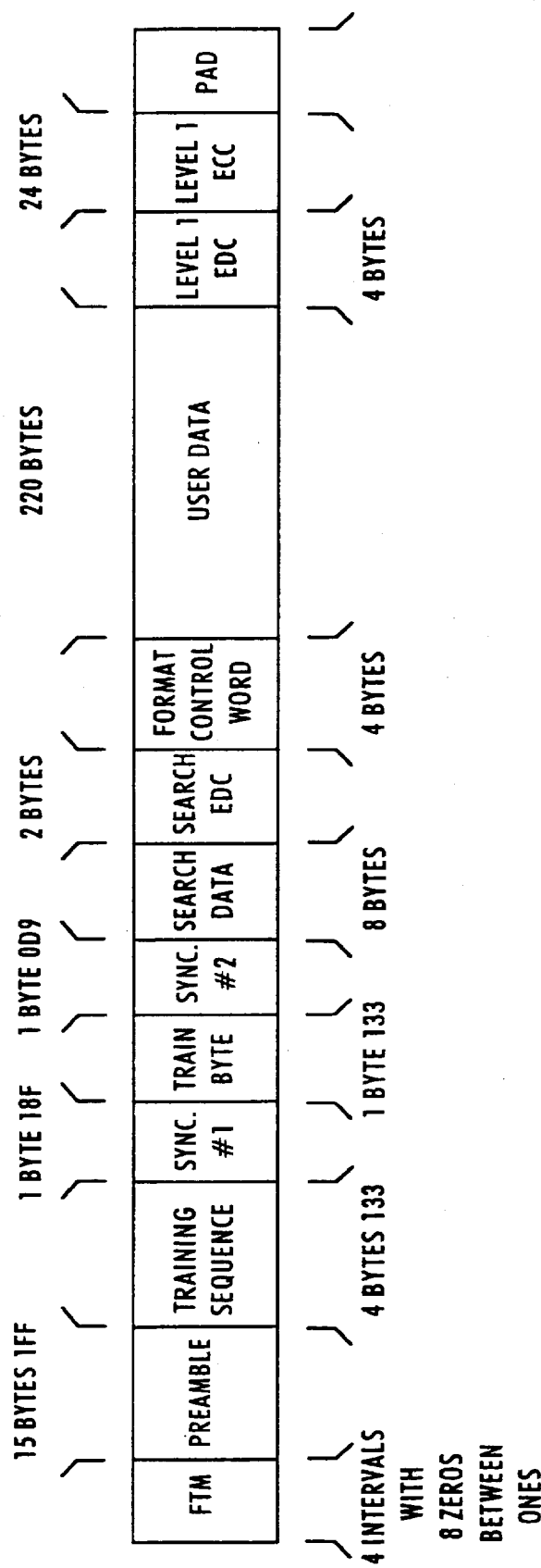
FIG. 11E shows the format of the digital information within the data blocks in the recorded format of FIGS. 11A to 11D.

The fourth write head $W_3$ operates in essentially the same manner as the second write head $W_1$, discussed above. As the fourth write head $W_3$ passes down over the tape, that head writes another non-servo track of data only. The fourth write head $W_3$ writes that track overlapping the third data track as shown in FIG. 11D. The fourth write head W.writes the fourth data track at the second azimuth angle. The information recorded at that angle in the fourth track is readable by read heads oriented at the same azimuth angle, e.g. read heads $R_1$ and $R_3$.

The track recording sequence illustrated in FIGS. 11A to 11d repeats for each rotation of the ASHA during a data recording operation. Preferably, the read heads alternately scan the recorded tracks during the data recording operation. Although not shown, error detection circuitry responsive to the read signals detects errors, if any, in the recorded tracks. In response to the errors, the system can re-record data.

The read heads are somewhat wider than the data track width. When properly centered on a track, a read head will overlap slightly onto adjacent track areas. In the data areas, because of the different azimuth angles during recording, the read head picks up the signals only from the data track it is reading, i.e. the data track written using the azimuth angle corresponding to that of the particular read head. For read heads $R_0$ and $R_2$, the heads are oriented at the same azimuth angle as the servo and data write heads $W_0$ and $W_2$, therefore the read heads $R_0$ and $R_2$ pick up servo signals as well as data signals. Because these heads are wider than one data track, each of these heads will pick up some portion of the A servo signals and some portion of the B servo signals, albeit at different times. The various tracking functions are then controlled by determining the proportional amount of each A and B signal picked up by each of the read heads $R_0$ and $R_2$.

Consider the read head $R_2$ as an example, and assume that head is centered to read data track 3 in FIG. 3. As that head passes over the top servo region, signals from the head are sampled in a first servo time window, selected to be within the period that the head should go past the servo region $A_T$. The head overlaps the $A_T$ servo burst by some relatively small amount, e.g. 30%. During a second servo time window, selected to be within the period that the head should go past the servo region $B_T$, signals from the read head are sampled again. When centered on the data track 3, the read head $R_2$ should overlap the servo region $B_T$ by a relatively large amount, e.g. 70%.

The exemplary relationship between A and B servos is 70/30 (or 30/70 for read by head $R_0$), though the relationship may range from 60/40 to 80/20. A determination of the relationship of the actual sampled amplitudes can then be used to produce an error signal indicating a difference from the amplitude relationship expected when the read head $R_0$ or $R_2$ is centered over the corresponding data track. A similar error signal can be developed by time window sampling of the servo bursts $A_B$ and $B_B$ in the lower servo region.

FIG. 11E illustrates the format of the digital information recorded in one of the data blocks. The data block is preceded by, or begins with, a format timing mark (FTM). The FTM is a predetermined sequence of '1s' and '0s' indicating the start of the data block. In the illustrated example, the FTM comprises four intervals with eight '0s' between '1s'. As the read head passes over a data track, the associated signal processing circuitry looks for this unique sequence of '1s' and '0s' in predetermined time windows when the start of blocks of data are expected. The processing circuitry will process the bits following a detected FTM on the assumption that the bits are arranged in accord with the illustrated data block format. The specific timing and acquisition of a format timing mark in accordance with embodiments of the present invention will be described in more detail later with respect to FIG. 12. The format timing mark may be read asynchronously, and when recognized, causes the read channel to start processing a new block of data.

The next information recorded in each data block is preamble information that allows the phase locked loop generator to lock up. A training sequence and synchronization and training bytes follow the preamble information. The training byte allows a filter in the read channel to optimize itself for that part of the tape. The synchronization bytes provide a "fault tolerance synchronization" with a separator byte (training byte) in the middle. The search information will be processed if either one of the two synchronization bytes are recovered.

The search data and search error detection code comprise 10 bytes of information, following the synchronization bytes. The 8 bytes of search data include the lower 3 bytes of the logical block or user block count, 2 bytes are the lower bytes of a file mark count, and 2 bytes are the lower bytes of a set mark count. One byte of the search data contains miscellaneous bits that can be used for different purposes, such as indicating the end of recorded data. The search error detection code includes two bytes that are used for error detection for the search data.

The format control word is 4 bytes of data that indicates the block number within a frame, the lower order 8 bits of a frame number, and the type of track. The block includes 220 bytes of user data, followed by 4 bytes of error data correction and 24 bytes of error correcting code information for correction of the user data. The error correction code is used for everything in the data block except for the search data. At the end of the data block is one byte of pad.

Figure 12:
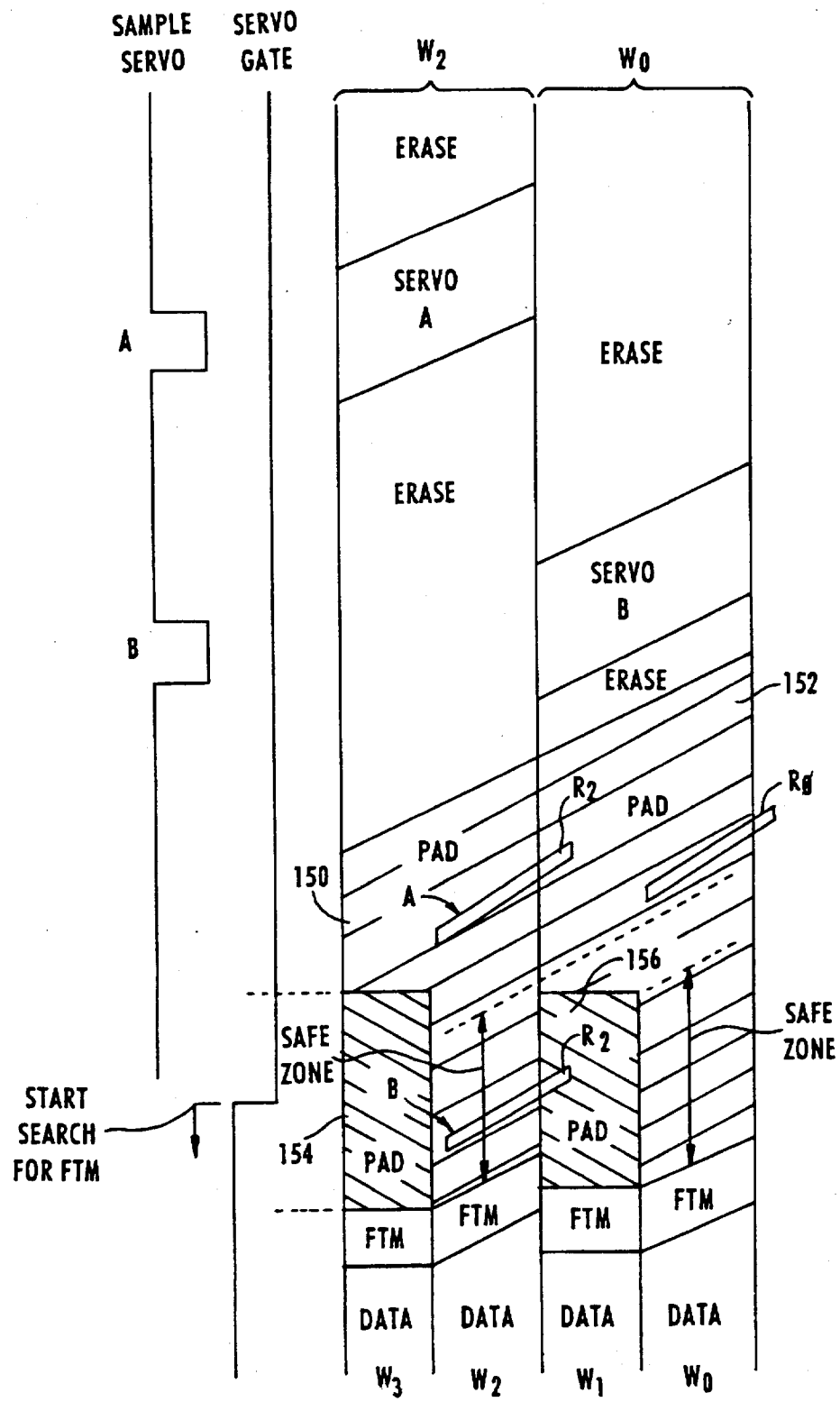
FIG. 12 is a diagram of a portion of recorded tracks in accordance with an embodiment of the present invention.
Figure 13:
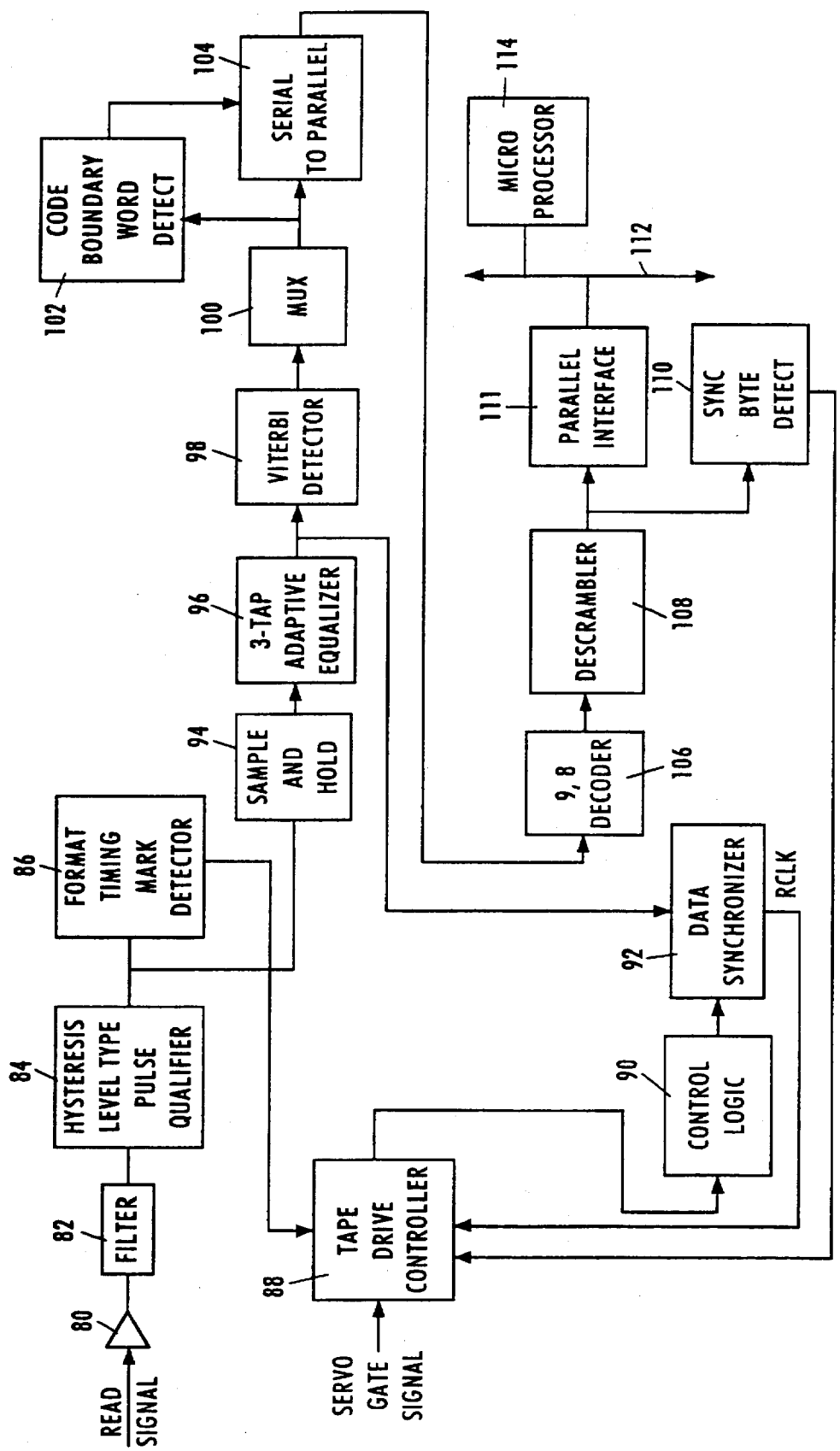
FIG. 13 is a block diagram of the read channel constructed in accordance with an embodiment of the present invention.

A block diagram of an exemplary embodiment of data detection circuitry is provided in FIG. 13. A read signal from the read head is amplified and filtered by an amplifier 80 and filter 82. The signal is passed through a hysteresis level type pulse qualifier 84 and then to a format timing mark detector 86. If the format timing mark is detected, a signal is sent to a tape drive controller 88, which asserts a control signal to read/write control logic 90. The tape drive controller 88 will only accept the format timing mark detection signal when the servo gate signal from the servo gate signal detector 87 (FIG. 9) indicates that the read head is in a safe zone, as will be described in more detail later with respect to FIG. 12.

The control logic 90 asserts a control signal to a data synchronizer 92 that has a phase locked loop to enter an acquire mode. The read signal should now represent the preamble information, which is passed through a sample and hold circuit 94 and a 3-tap adaptive equalizer 96. The data synchronizer uses the preamble bytes to establish the clocking. The data synchronizer then moves into a tracking mode.

The read signal, following the preamble bytes, contains training bytes. The read signal is passed through a viterbi detector 98 and a multiplexer 100 to a code word boundary detector 102 which uses the training bytes to establish the beginning and end of the byte boundaries. Following the training bytes in the read signal are the synchronization bytes. These pass through a serial to parallel converter 104 and are decoded by 9,8 decoder 106. The synchronization bytes are detected by a synchronization byte detector 110, which outputs a signal to the tape drive controller 88. The search data, which follows the synchronization bytes in the read signal, are then placed on a data bus 112 for use by a microprocessor 114 in determining the location in a recording.

FIG. 12 is a detailed depiction of an exemplary embodiment of the track format near the top of a sequence of four recorded tracks. In this example, the servo burst written by the first write head W0 is written after a relatively longer erase section (further from the top of the tape), and the servo burst written by the third write head W2 is written after a relatively shorter erase section (nearer to the top). This is opposite to that shown in FIGS. 11A–D, and illustrates that the write head W0 may write its servo burst either nearer the top or further from the top of the tape than the other write head W2.

Following the servo section (servo B in FIG. 12) the write head W0 writes an erase section, followed by a pad section. The pad section is then followed by a format timing mark (FTM), and then the data block. Write head W1, oriented with a second azimuth different than the first azimuthal orientation of the first write head W0 writes only a data track, with no servo information, as explained earlier with respect to FIGS. 11A–11D. The second write head W1 first writes a pad section, followed by a format timing mark, and then data. The pad written by the second write head W1 starts further from the top of the tape than the beginning of the pad written by the first write head W0.

The third write head W2 writes a third track, with servo information, with the same azimuthal orientation as the track written by the first write head W0. The fourth write head W3 then writes a track without servo information, beginning with the pad, similar to and with the same azimuthal orientation as the second track.

The erase sections are written, for example, at F MHz, where F is 16 for instance. The pads are written then, with F/2, the format timing marks with F/8, and the servo areas with F/4, so that these areas can be distinguished from one another when read.

It is necessary for the read channel to properly recognize the format timing mark to prepare it for processing of the data block. Mis-identification of the format timing mark will cause a mis-reading of data, possibly a single data block or a whole track. The recovery from the mis-read may include re-writing of the single data block or necessitate re-writing a whole data track. This severely hampers the performance of the tape drive.

The possibility of mis-identification of the format timing mark is raised by a single read head simultaneously passing over the pad sections of two adjacent pads written by write heads of the same azimuthal orientation, such as W0 and W2. For example, in FIG. 12, in the illustrated position A, the read head R2 extends over the pad sections 150, 152 written by the two different write heads W0, W2. Although the pads are written with the same frequency (F/2) by the two heads, slight differences in the heads will cause a phase difference in the recorded signals. Hence, the signal from the read head R2 when it is in position A covering both pads 150 and 152, if read, could cause an early mis-identification of the format timing mark due to same azimuth interference.

In order to prevent a misidentification of the format timing mark, the present invention prevents reading of the signal from the read head R2 until the read head R2 reaches a safe zone, between the two pad sections of opposite azimuth 154, 156 written with different azimuth write heads W1, W3. In the safe zone, it is not possible for the third read head R2 to read two adjacent pad sections of the same azimuth. There is therefore no possibility of a misidentification caused by same azimuth interference. Once in the safe zone, the read signal from the read head R2 can be safely read to look for the format timing mark. Safe zones for each of the other read heads R0, R1 and R3 are similarly established between two pads of different azimuth.

To assure that the read head is within the safe zone when the read signal is read by the read channel, it is necessary to accurately time when the search for the format timing mark starts. The timing is precisely established, in certain embodiments, by reference to the LS1 stripe as described earlier with respect to the writing and reading operations. Based on the timing developed in response to the detection of the LS1 stripe, a "servo gate" timing signal is generated, shown in FIG. 12. The "sample servo" signal is also shown in FIG. 12, and causes the sampling of the servo bursts. The servo gate signal, when high, causes the read channel to be in the servo mode to acquire the servo burst signals. When the servo gate signal goes low, as timed by the timer 95, the read channel starts searching for the format timing mark. Once the data blocks are completed for a track, the servo gate signal goes high again, causing the read channel to look for the servo bursts at the bottom of the track.

Although the invention has been described as using the LS1 stripe and the earlier described circuitry to precisely time the start of the search for the format timing mark when the read heads are in their safe zones, other embodiments of the present invention use other methods of precisely timing the start of the search for the format timing mark.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of searching for a start of data on a data track recorded with an arcuate scanner in a series of alternately written first azimuth data tracks and second azimuth data tracks on a recording tape, the first azimuth data tracks and the second azimuth data tracks containing pad areas, wherein a portion of the pad areas written in adjacent first azimuth tracks are spaced near enough to one another to enable a single first azimuth read head to simultaneously read the first azimuth pad areas of the adjacent first azimuth tracks, the method comprising the steps of:

determining when a first azimuth read head is in a safe zone of a first azimuth pad area, wherein the safe zone of a first azimuth pad area is a portion of the first azimuth pad area between the second azimuth pad areas written on second azimuth data tracks on either side of the first azimuth data track such that a single first azimuth read head is not able to simultaneously read the first azimuth pad areas of the adjacent first azimuth tracks; and initiating a search for the start of data when the first azimuth read head is in the safe zone of the first azimuth pad area.

2. The method of claim 1, wherein the start of data is immediately preceded by a format timing mark that follows the safe zone, the format timing mark indicating the start of data, the step of initiating including searching for the format timing mark.

3. The method of claim 1, further comprising determining when a second azimuth read head is in a safe zone of a second azimuth pad area; and initiating a search for the start of data when the second azimuth read head is in the safe zone of the second azimuth pad area.

4. The method of claim 3, wherein the safe zone of a second azimuth pad area is an area in a pad written on a second azimuth data track between first azimuth pad areas written on first azimuth data tracks on either side of the second azimuth data track.

5. The method of claim 1, wherein the step of determining includes locating a reference point on the recorded tape and determining a timing based on the reference point when the first azimuth read head will be in the safe zone of the first azimuth pad area.

6. An arrangement for reading data from data tracks recorded on a recording tape by an arcuate scanner, comprising:

first azimuth read heads that read data tracks written with a first azimuthal orientation;

second azimuth read heads that read data tracks written with a second azimuthal orientation, each of the first and second azimuth data tracks having an initial pad area, followed by a start of data indicator, followed by data, the first and second azimuth data tracks being alternately recorded in adjacent arcs on the recording tape wherein a portion of the pad areas written in adjacent first azimuth tracks are spaced near enough to one another to enable a single first azimuth read head to simultaneously read the first azimuth pad areas of the adjacent first azimuth tracks;

a read channel coupled to the first and second azimuth read heads;

a timing circuit coupled to the read channel that causes the read channel to initiate searching for the start of data indicator in a particular data track only when the read head having the same azimuth as the data track is in a safe zone of the pad area of that data track, wherein the safe zone of a pad area written on a first azimuth data track is between pad areas written on second azimuth data tracks on either side of the first azimuth data track such that a single first azimuth read head is not able to simultaneously read the first azimuth pad areas of the adjacent first azimuth tracks, and wherein the safe zone of pad area written on a second azimuth data track is between first azimuth pad areas written on the first azimuth data tracks on either side of the second azimuth data track.

* * * * *